No. 641,753. Patented Jan. 23, 1900.
C. E. SWARTZBAUGH.
STEAM COOKER.
(Application filed Sept. 16, 1898.)
(No Model.)
Fig. 1.
Fig. 4.
Fig. 5.
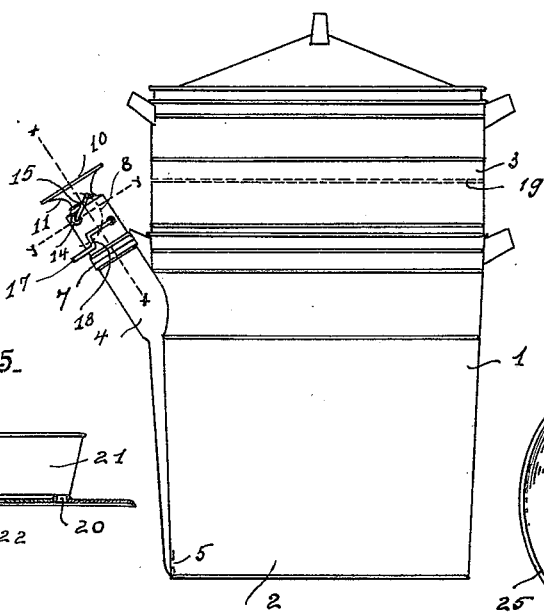
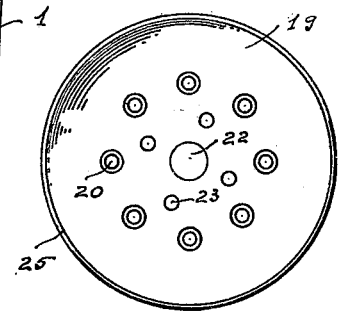
Fig. 2.
Fig. 3.
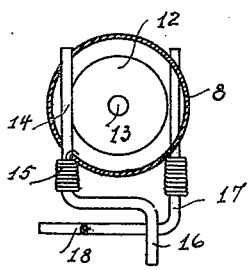
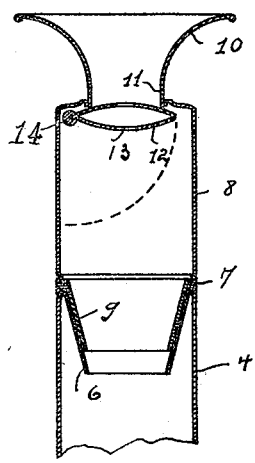
Witnesses
H. H. Martin
L. E. Brown
Inventor:
Charles E. Swartzbaugh
By Munn Hall
His Attorneys
THE NORRIS PETERS CO., PHOTO-LITHO., WASHINGTON, D. C.

UNITED STATES PATENT OFFICE.

CHARLES E. SWARTZBAUGH, OF TOLEDO, OHIO.

STEAM-COOKER.

SPECIFICATION forming part of Letters Patent No. 641,753, dated January 23, 1900.

Application filed September 16, 1898. Serial No. 691,075. (No model.)

*To all whom it may concern:*

Be it known that I, CHARLES E. SWARTZBAUGH, a citizen of the United States, residing at Toledo, Lucas county, Ohio, have invented certain new and useful Improvements in Steam-Cookers, of which the following is a specification.

My invention relates to a steam-cooker of that character in which the food is cooked by steam arising from the ebullition of water within the lower portion of the vessel.

The invention relates particularly to means for sounding an audible alarm when the water is below the required line within the vessel, having particular reference to the construction of the alarm mechanism, whereby when notice is given by the alarm of the evaporation below a normal point the vessel may be replenished through the alarm-spout without requiring the removal or disturbance of any of the parts of the cooker. I have also provided an improved disk for supporting the different pans within the cooker, whereby steam is allowed to come in contact with the bottom of the pans.

Like numerals of reference indicate like parts throughout the several views.

In the drawings, Figure 1 is an elevation of one form of cooker with my improved alarm attached; Fig. 2, a longitudinal vertical section through the alarm-spout, showing the diaphragm and whistle in normal position; Fig. 3, a top plan view of the alarm-spout, showing the diaphragm and whistle in normal position and showing the spring-catch more fully than in Fig. 1, Figs. 2 and 3 being enlarged views; Fig. 4, an elevation of a perforated disk hereinafter referred to, and Fig. 5 a cross-section through the disk.

1 designates the cooker, comprising the bottom vessel 2 and any desired number of food-receptacles 3, surmounting the same. The vessel 2 is provided with a spout or conduit 4, extending upward from the bottom outside of the vessel and communicating with the interior of the vessel through an orifice 5, whereby when the vessel is supplied with the required amount of water the orifice is sealed and when the water is evaporated to a point below the orifice steam may escape through the conduit. The upper end of the conduit is preferably circular in cross-section and formed with a depending tapered seamless tube 6, connected with the conduit by a steam-tight joint 7, whereby steam can only escape through the contracted lower end of the tube and all water of condensation is returned to the vessel.

8 designates a tube formed with a tapered end 9 of seamless tubing, which telescopes within the socket formed by the funnel-shaped tube 6 and fits so closely as to prevent the escape of steam except through the two telescoping tubes.

The upper end of tube 8 is formed with a funnel-mouth 10, the lower end 11 of which is of less diameter than the tube and against the lower end of which normally rests a spring-actuated diaphragm 12, formed with a whistle 13 centrally of the same.

Diaphragm 12 is mounted upon a shaft 14, journaled in the casing of the tube, and a coiled spring 15, one end of which engages the shaft and the other end the tube, normally holds the diaphragm closed against the lower end of the funnel-mouth. Shaft 14 is provided with a crank 16, whereby the diaphragm may be swung downwardly in the arc of a circle, as shown in dotted lines, Figs. 1 and 2, thereby opening the funnel-mouth and permitting the introduction of water when needed. In order to hold the diaphragm depressed when desired, there is arranged a spring-catch 17 in the path of travel of the crank, whereby when the crank is turned sufficiently to open the tube the crank-arm will depress the catch and engage in the depression 18. When sufficient water has been introduced into the vessel, the catch 17 may be depressed and the diaphragm, actuated by spring 15, returns to place.

From the foregoing it will be seen that by reason of the telescoping seamless tubes all escaping steam is forced to pass through the tube proper, so that the automatic low-water alarm will not fail to operate, and that by reason of the provision for pouring the water through the tube a great advantage is gained over that class of cookers in which it is necessary to remove portions for this purpose. A further advantage is in the possibility of cleaning the tube, as it is only necessary to depress the diaphragm to allow ready access thereto. I have also provided improved removable disks 19 to be used with the cooker for the support of cooking-pans and the like. These disks have perforations 20, circumferentially struck up, arranged in a circle to support the pans or receptacles 21 within the cooker out of contact with the disk. The disks also have a larger central perforation 22 and perforations 23 circumferentially spaced within the circle of the struck-up annular portions, whereby receptacle 21 is supported by the upwardly-projecting portions and steam is allowed to come in contact with the bottom 24 of the receptacle as it rises through the perforations 22 and 23 and surrounds the receptacle upon all sides. The disk is supported in the interior of the cooker in the usual manner, and to allow the condensation to drain off of the surface the rim or edge 25 is curved slightly downward.

Having described my invention, what I claim, and desire to secure by Letters Patent, is—

1. In a steam-cooker, an alarm mechanism comprising a conduit connected with the water-chamber, and having a funnel-shaped upper end, a spring-pressed diaphragm normally closing said conduit, a whistle in said diaphragm, and means for swinging the diaphragm to open or close the conduit.

2. In a steam-cooker, an alarm mechanism connected with the water-receptacle, comprising a tube, a diaphragm within the tube having a whistle arranged therein, means for depressing the diaphragm, and a catch for holding the diaphragm depressed.

CHARLES E. SWARTZBAUGH.

In presence of—
WILBER A. OWEN,
L. E. BROWN.